United States Patent [19]

Hoglund

[11] 4,034,647
[45] July 12, 1977

[54] SUPPORT FOR MILLING CUTTER
[75] Inventor: Nils O. Hoglund, Short Hills, N.J.
[73] Assignee: Hoglund Tri-Ordinate Corporation, Berkeley Heights, N.J.
[21] Appl. No.: 627,183
[22] Filed: Oct. 30, 1975
[51] Int. Cl.[2] .................................. B23C 1/025
[52] U.S. Cl. ................................ 90/20.5; 90/23
[58] Field of Search ............... 90/15.1, 20.5, 23; 82/31

[56] References Cited
U.S. PATENT DOCUMENTS

| | | | |
|---|---|---|---|
| 1,453,470 | 5/1923 | Lees | 90/20.5 |
| 1,599,600 | 9/1926 | Vivarttas | 90/20.5 |
| 3,170,375 | 2/1965 | Weidauer | 90/15.1 |
| 3,680,439 | 8/1972 | Lancaster et al. | 90/15.1 |

Primary Examiner—Gil Weidenfeld
Attorney, Agent, or Firm—Pennie & Edmonds

[57] ABSTRACT

An improvement in a milling apparatus wherein the milling cutter is to perform an operation on successive workpieces indexed into a milling station. The improvement comprises a secondary support for rotatably supporting the free end of the cutter during the milling operation. The secondary support is attached to the main support by which the milling tool is held by its shank. The secondary support is mounted for pivoting movement into and out of engagement with the milling cutter to permit indexing a workpiece through the milling station.

10 Claims, 3 Drawing Figures

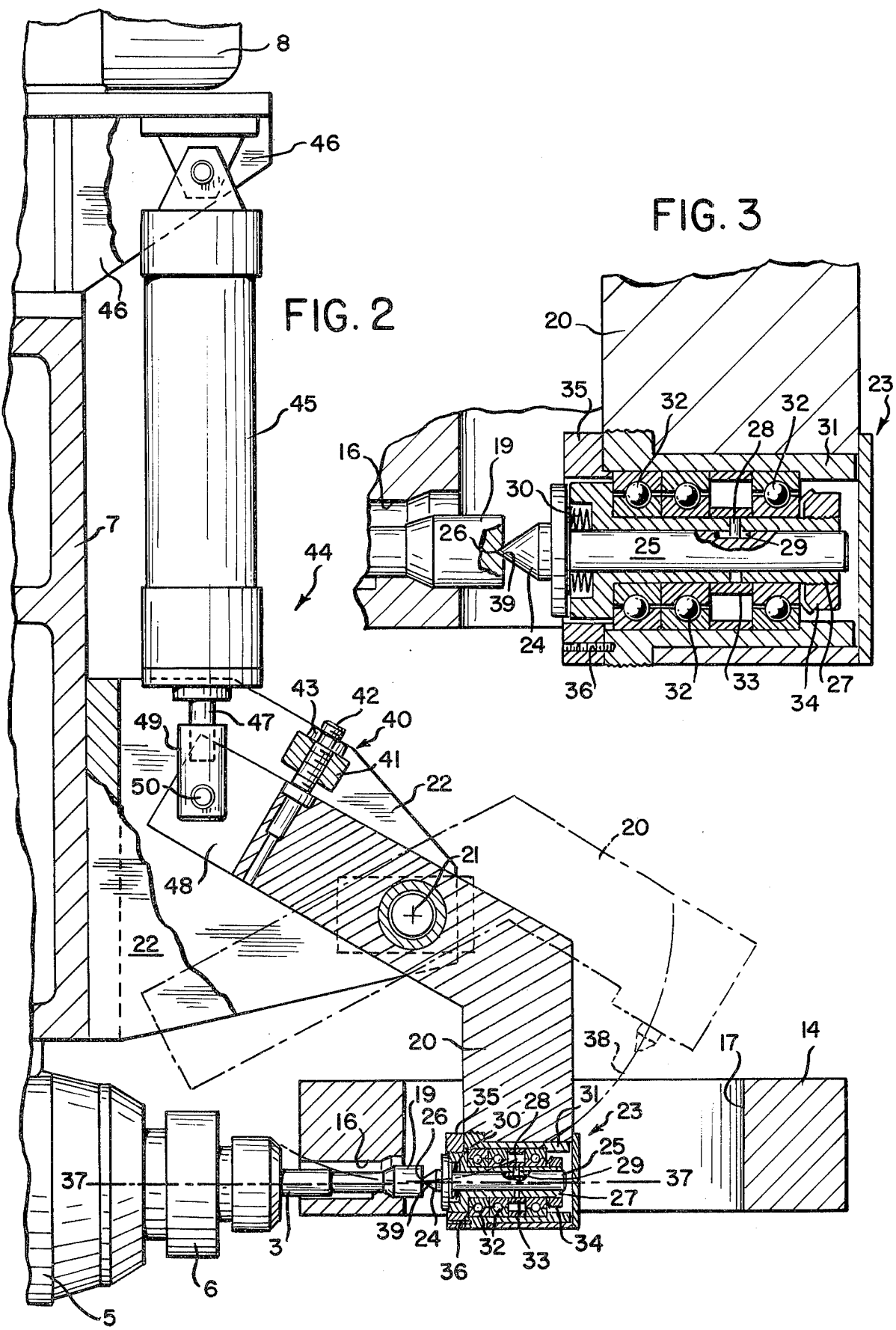

SUPPORT FOR MILLING CUTTER

BACKGROUND OF THE INVENTION

With processing equipment used to effect a processing operation on a workpiece, it is sometimes necessary to provide supplementary support for the processing tool. For example, in a milling apparatus, where the milling cutter has an extended length for insertion into a hole or cavity in the workpiece, the cutter will have a tendency to vibrate and bend if not properly supported. In certain circumstances, however, proper support of the tool is not readily available. This is particularly true where the processing operation requires that the tool be supported at its free end internally of the workpiece. The problems of fully supporting such a tool are compounded where the cutting tool is disposed at a working station and successive workpieces are to be indexed into and out of a working station. With this type of equipment, it is further necessary that the internal support for the tool be provided after the workpiece is moved into the working station and that it be removed prior to indexing the workpieces out of the working station.

In the past, processing equipment such as boring and milling machines have been provided with outboard supports for supporting a boring bar or cutter from the other side of the hole that is being surfaced. These outboard supports may conventionally consist of a center or journal in which an arbor that holds the cutter is supported. With these types of construction, however, it is necessary to manually attach and remove the outboard support structure before and after each processing operation. These machines are quite specialized in their function and the additional support which is required together with the time element involved in connecting and disconnecting the support adds to the overall cost of the workpiece processing operation.

SUMMARY OF THE INVENTION

In accordance with the teachings of the present invention, applicant has provided a secondary support for the processing tool which is mounted on the main support for the tool in such a way that it may be readily moved into and out of supporting engagement with the tool in properly timed sequence to the indexing of workpieces through the processing station. A processing apparatus in which applicant's improved tool support may be used can be, for example, a milling apparatus wherein a plurality of workpieces are supported on a turret and indexed through the milling station. The secondary support structure for the milling tool is of particular usefulness where the workpiece is, for example, an annular member having a hole extending through from the outside surface to the internal opening area. In the situation where such an annular workpiece has a considerable thickness, the milling cutter, which is normally supported for rotation by its shank end, will have to extend the necessary distance to the point where the milling operation is to be performed. An example of a workpiece may be a rotary Wankel type engine having an exhaust port extending through the annular body of the engine and into the center cavity or open area. With such a workpiece, the milling cutter may be required to extend 3 inches beyond the tool support structure in which its shank end is mounted.

In order to fully support a milling cutter of the type described above, a secondary cutter support means comprising a male center mechanism is pivotally attached to the main support structure in which the shank of the milling cutter is secured. For cooperating with the male center mechanism, the free end of the milling cutter is provided with a female center. This center is coincident with the axis of rotation of the milling cutter and is adapted to receive the male center similarly aligned along the axis of rotation of the cutter. The male center of the secondary cutter support means is mounted on the end of a support arm for movement through an arc between a first position supporting the milling cutter and a second position out of the path of indexing movement of the workpiece. To provide this movement of the secondary support means, a hydraulic power mechanism is provided. This power mechanism is also supported by the main support means for the milling cutter and is operatively attached to the support arm of the secondary support means for effecting the movement thereof between the first and second positions.

BRIEF DESCRIPTION OF THE DRAWINGS

FIG. 2 is a detailed cross-sectional view of the secondary support means shown in FIG. 1; and FIG. 3 is an enlarged view of a portion of the secondary support means shown in FIG. 2.

DETAILED DESCRIPTION OF THE PREFERRED EMBODIMENT

Figure 1:
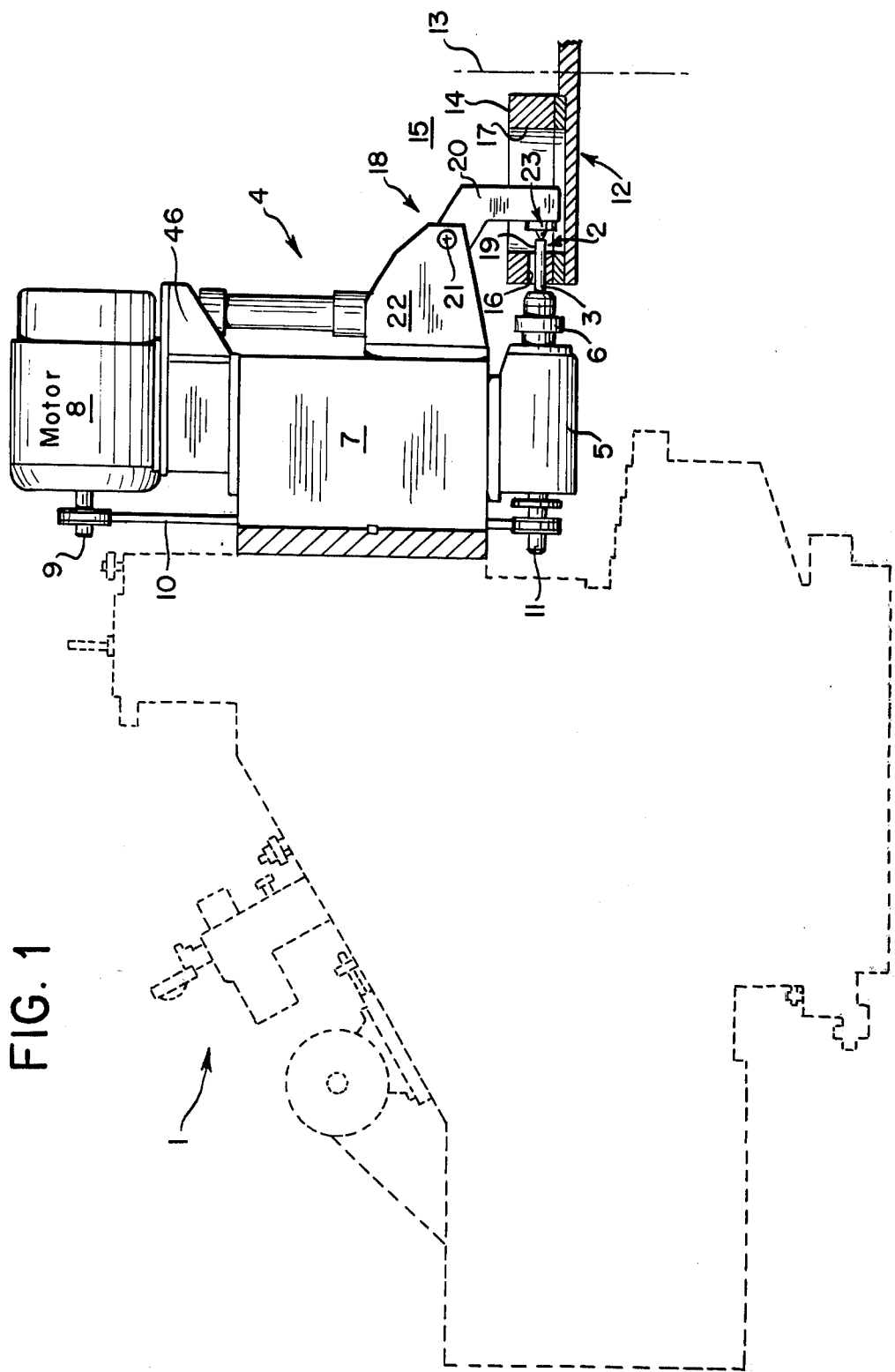
FIG. 1 is a plan view showing a typical milling apparatus incorporating the secondary cutter support means of the present invention.

FIG. 1 shows a conventional type three-dimensional milling machine 1. This machine may have the construction as disclosed in my previous U.S. Pat. No. 3,169,448. The milling cutter 2 of the machine is supported at its shank end 3 in a main support means 4 defined by a power driven spindle mechanism 5. The spindle includes a chuck 6 in which the shank end of the cutter is inserted. The spindle 5 is supported on the housing structure 7 of the main support means. A motor 8 is mounted on top of the housing and includes drive shaft 9 which through a drive belt 10 is connected to the drive shaft 11 of the spindle 5. As will be apparent, the motor provides the drive for rotating a milling cutter 2. The housing structure 7 of the main support means is mounted on conventional vertically and horizontally disposed slides for three-dimensional movement so as to provide for similar movement of the milling cutter with respect to the workpiece.

The milling apparatus as shown in FIG. 1 further includes a turret 12 on which a plurality of workpieces are mounted for rotation about the vertical axis 13 of the turret. One such workpiece 14 is shown in FIG. 1 as being disposed in a milling station 15 where the milling cutter is to perform its processing operation. Suitable conventional mechanisms are provided for indexing the turret to successively locate the individual workpieces in the milling station 15. Also, in a conventional manner, the movement of the cutting tool into and out of the workpieces disposed at the milling station will be controlled in time sequence to the indexing of the workpieces.

As shown in both FIGS. 1 and 2, the workpiece 14 is annular in shape and includes a hole 16 extending from its outer peripheral surface into a center cavity 17 of the workpiece. The particular workpiece shown in the drawings is the annular housing structure of a Wankel type rotary engine and the hole 16 is an exhaust port requiring milling of its surface.

In accordance with the teachings of the present invention, a secondary support means generally indicated at 18 is provided for supporting the free or cutting end 19 of the milling cutter 2. The secondary support means comprises a support arm 20 which is pivotally mounted at 21 between outstanding bracket members 22, in turn, forming part of the main support means 4. The support arm is pivotally mounted at 21 intermediate its ends; and as shown, is generally angular in shape. The lower end of the arm as shown in the drawings is the working end in which a male centering mechanism generally designated at 23 is attached.

The male centering mechanism includes a male center 24 having a rod shaped body 25 and a centering point 26. The male center is supported for axial movement within a sleeve member 27. The axial movement of the male center is controlled by a pin 28 extending from the sleeve and into an axially formed slot 29 in its rod shaped body portion 25. The male center is urged outwardly of the sleeve by means of a series of spring washer elements 30.

The sleeve 27 is rotatably supported within a housing 31 by means of preloaded ball bearings 32. The preloading of the bearings 32 is established by the spacers 33 acting in conjunction with the members 34, 35 which respectively engage against the inner and outer bearing races of the bearings 32, 33. As shown in FIGS. 2 and 3, the member 34 is threaded onto the end of the sleeve 27 while the member 35 is attached to the housing 31 by suitable means such as Allan screws one of which is shown at 36. The entire male centering mechanism, from the male center to the housing 31, defines a cartridge structure which is removably fit into the working end of the support arm.

As indicated above, the support arm is mounted on the main support means for rotation about a mounting axis 21. This mounting axis extends perpendicular to the axis of rotation 37 of the milling cutter. The axis 37 is coincident with the longitudinal axis of the milling cutter. The location of the mounting axis 21 and the positioning of the male centering mechanism, and in particular the centering point 26 of the male center 24, on the support arm, is such that the centering point 26 moves on an arc 38 about the axis 21. This arc, at one point, has a tangent which is coincident with the axis of rotation 37 of the milling cutter. This point on the arc 38 is shown in FIG. 2 at the location of the point of intersection of the axis 37 with the arc 38. This position of the centering point corresponds to the working position of the secondary support means for the milling cutter.

When the secondary support means is in the position shown in FIG. 2, the spring means 30 will yieldably hold the male center against the cutting end of the milling cutter with the centering point 26 received within a female center 39 of the cutter at a point coincident with its axis of rotation 37. The yieldable engagement of the male center against the cutting tool permits proper adjustment of the male centering mechanism so that it may be precisely located within the female center 39.

Once this precise location has been established, an adjustable stop mechanism 40 is set so that this positioning may be repeated for each successive milling of each successive workpiece. As shown in FIG. 2, the adjustable stop means is positioned in the path of movement of the support arm 20 as it moves the male centering mechanism toward its working position. In construction, the adjustable stop means includes a support member 41 fixed between the brackets 22 of the main support. It also includes a threaded stop element 42 threadedly received within the support member 41. The stop element may be threaded through the member 41 to the proper position and locked in this position by the locking nut 43.

In FIG. 2, the working position of the secondary support means is shown in full lines. For reference, this position is defined as the first position of the secondary support means. FIG. 2 also shows, by phantom lines, the secondary support means in a second retracted position. In this second position, the turret 12 is free to rotate to index a workpiece into or out of the milling station. Of course, during this indexing, the milling cutter will also be retracted from the path of indexing movement of the workpiece by conventional mechanisms included in the milling apparatus. For purposes of moving the secondary support means between the first working position and the second retracted position, a hydraulically actuated power piston cylinder mechanism generally shown at 44 is provided. This mechanism includes a cylinder 45 mounted between the brackets 22 and brackets 46 of the main support means. A piston rod 47 extends out one end of the cylinder and is pivotally connected to the end 48 of the working arm remote from the working end 23 by means of a clevis and pin connection 49, 50. The end 48 of the support arm is the actuating end of the arm.

For automatic operation of the milling apparatus, the movement of the milling cutter together with the secondary support therefore is electronically controlled by suitable conventional means to permit automatic indexing of the workpieces. With the secondary cutter support means of the present invention, the milling cutter is properly supported during the milling operation; and since the secondary support is itself mounted on the main support for the milling cutter, it will move with the cutter as the latter member moves axially and laterally of its axis of rotation during the milling operation. Also, at the end of this operation, the secondary support can be moved out of the way with essentially no time delay. Such retracting movement can be sequenced to occur at the same time the cutter is being withdrawn from the workpiece.

Although the above description of the invention has been made with respect to a milling apparatus, it will be appreciated that it is equally applicable to other processing equipment such as boring, grinding or other machines where the processing tool requires support at both ends.

I claim:

1. In a milling apparatus having means for holding a workpiece at a milling station, a milling cutter having a shank end and a cutting end disposed at said station, and main support means for mounting said milling cutter for movement into milling engagement with the workpiece when positioned in the milling station and for withdrawing the cutter from the workpiece to permit movement thereof, the shank end of said milling cutter being mounted in said main support means for rotation about a predetermined axis extending through the other cutting end thereof, the improvement comprising:

a. a secondary cutter support means supporting the cutter at the cutting end for rotation about said predetermined axis; and
b. means for attaching said secondary support means to said main support means for pivoting movement between a first position supporting the cutting end of the cutter and a second position removed therefrom to permit movement of the workpiece, said pivoting movement taking place about a mounting axis extending perpendicular to said predetermined axis with the secondary support means moving along an arc which at one point has a tangent coincident with said predetermined axis, said one point corresponding to the first position of said secondary support means.

2. The improvement in the milling apparatus as set forth in claim 1 further comprising:
a. means for moving said workpiece into and out of said milling station.

3. The improvement in the milling apparatus as set forth in claim 1 further comprising:
a. means for indexing said workpiece into and out of said milling station.

4. The improvement in the milling apparatus as set forth in claim 1 wherein:
a. said secondary support means includes:
1. a support arm having a working end, and
2. a centering mechanism attached to the working end of the support arm for rotatably supporting the cutting end of the cutter when said secondary support means is in said first position.

5. The improvement in the milling apparatus as set forth in claim 4 wherein:
a. said centering mechanism includes:
1. a male center having a centering point located on said arc and facing in the direction of movement of the secondary support means toward said first position,
2. a housing for holding said center in the working end of said support arm, and
3. spring means carried by said housing for yieldably urging said center into supporting engagement with the cutting end of said cutter when said secondary support means is in said first position; and
b. the cutting end of the cutter includes a female center located on said predetermined axis and facing in a direction to receive said male center when the secondary support means is in said first position.

6. The improvement in the milling apparatus as set forth in claim 5 wherein:
a. said male center has a rod shaped body slidably mounted in said housing for axial sliding movement in a direction coincident with said predetermined axis as measured when said secondary support means is in said first position; and
b. said spring means is positioned within said housing for yieldably holding said male center against axial movement away from the cutting end of the cutter when the male center is received within the female center.

7. The improvement in the milling apparatus as set forth in claim 6 wherein:
a. said support arm is pivotally mounted on said main support means intermediate its ends with the end opposite the working end being the actuating end of the arm; and
b. power means is connected to the actuating end of the arm for selectively pivoting the arm about its mounting axis to move the secondary support means between said first and second positions.

8. The improvement in the milling apparatus as set forth in claim 7 wherein:
a. said power means includes:
1. a hydraulic cylinder mounted on said main support means, and
2. a piston rod extending from the cylinder and pivotally connected to the actuating end of the arm.

9. The improvement in the milling apparatus as set forth in claim 8 further comprising:
a. stop means mounted in the path of movement of said support arm toward said first position, said stop means being located at a position to be engaged by said arm when said secondary support means is in said first position; and
b. adjustable control means for adjusting the location of the stop means to vary the position of the working end of the support arm when said secondary support means is in said first position.

10. The improvement in the milling apparatus as set forth in claim 4 wherein said centering mechanism moves along said arc.

* * * * *